United States Patent [19]

Darr

[11] Patent Number: 4,639,206
[45] Date of Patent: Jan. 27, 1987

[54] IN-MOLD LABEL DISPENSER FOR BLOW MOLDING

[75] Inventor: Richard C. Darr, Seville, Ohio

[73] Assignee: Plastipak Packaging, Inc., Plymouth, Mich.

[21] Appl. No.: 787,913

[22] Filed: Oct. 16, 1985

[51] Int. Cl.⁴ .............................................. B29C 49/24
[52] U.S. Cl. .................... 425/503; 264/509; 425/504; 425/522; 425/539
[58] Field of Search .................... 264/509; 425/126 R, 425/503, 161, 504, 138, 522, 539, 540; 271/103, 106, 107

[56] References Cited

U.S. PATENT DOCUMENTS

| 3,292,209 | 12/1966 | Borkmann | 425/126 R |
| 3,324,508 | 6/1967 | Dickinson | 425/126 R |
| 4,355,967 | 10/1982 | Hellmer | 425/522 |
| 4,359,314 | 11/1982 | Hellmer | 425/522 |
| 4,397,625 | 8/1983 | Hellmer et al. | 425/522 |
| 4,479,644 | 10/1984 | Bartimes et al. | 425/503 |
| 4,479,770 | 10/1984 | Slat et al. | 425/503 |
| 4,479,771 | 10/1984 | Slat et al. | 425/503 |
| 4,498,854 | 2/1985 | Ross | 425/126 R |

Primary Examiner—Jay H. Woo
Assistant Examiner—Timothy W. Heitbrink
Attorney, Agent, or Firm—Brooks & Kushman

[57] ABSTRACT

An in-mold label dispenser (10,10') for supplying labels to a plastic blow molding machine (12) is disclosed as having a dispensing head (36) on which a first locator (40) is mounted so as to be moveable from a withdrawn position at one side of the mold to an inserted position between open mold sections (16) and into engagement with a second locator (42) mounted at the other side of the mold. The engagement of the first and second locators from opposite sides of the mold provides accurate location of the dispensing head (36) during movement from a mold aligned position to a label transfer position to provide transferring of the labels (34) to the mold from one or more label magazines (30). First and second supports (48, 50) on which the locators are mounted are moved by first and second actuators (52,54) to provide the movement between the mold aligned and label transfer positions. A first operator (86) preferably moves the dispensing head (36) between the withdrawn and inserted positions, while a second operator (126) is also preferably provided for moving the second locator (42) between a withdrawn and inserted position. A slide assembly (96) extends between the dispensing head (36) and the first support (48) to prevent rotation of the dispensing head about the first operator (86). One embodiment of the inmold label dispenser (10) has a single dispensing head (36) which provides all of the labels from one side of the mold, while another embodiment of the in-mold label dispenser (10') has a pair of the dispensing head (36,36') for providing labels from both sides of the mold.

16 Claims, 9 Drawing Figures

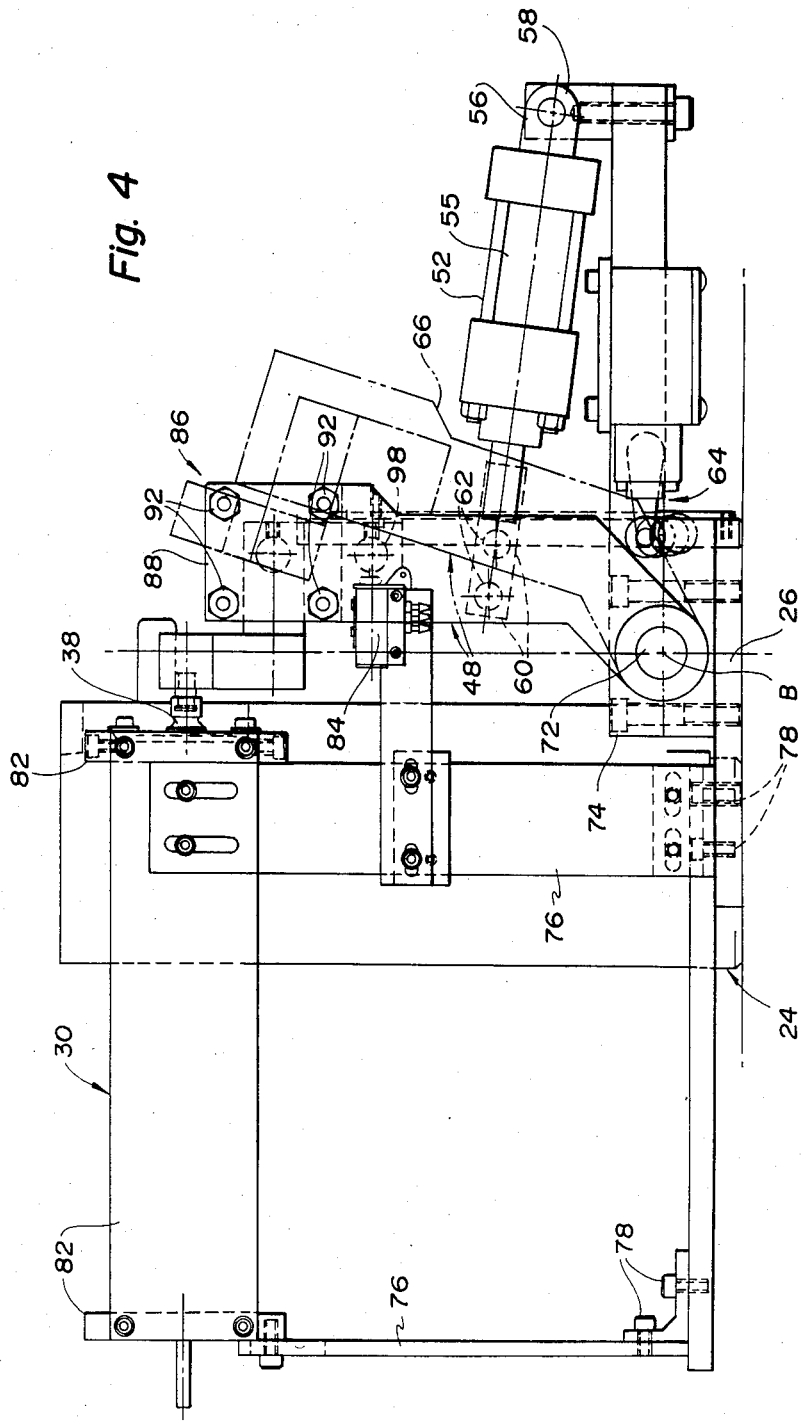

IN-MOLD LABEL DISPENSER FOR BLOW MOLDING

TECHNICAL FIELD

This invention relates to an in-mold label dispenser for a plastic blow molding machine and has particular utility for use with a multiple cavity mold type of blowing molding to supply at least one label to each cavity during each blow molding cycle.

BACKGROUND ART

Blow molding machines conventionally provide a parison, i.e. a tube of hot plastic, between open sections of a mold. Closing of the mold then clamps the parison and allows air to be blown into the parison such that it assumes the shape of the mold. After suitable cooling has taken place, the mold sections are opened to allow ejection of the molded part.

Blow molded parts such as containers have conventionally included paper labels that are glued thereto after the molding to identify the contents of the container to the consumer. One problem is that such paper labels can become wrinkled if dampened and can also become detached from the container if a waterproof glue is not used. Also, paper labels require a separate labeling step after the molding which thus adds to the cost of the container.

In-mold labeling has been developed in the recent past to provide superior bonding of labels to blow molded plastic parts. This in-mold labeling is performed by initially inserting a label within the mold prior to the introduction of the parison and by then closing sections of the mold in preparation for the blowing operation. The subsequent blowing operation forms the parison around the label to the shape of the mold and provides a permanent bond which is incapable of being broken by moisture or otherwise. Also, such in-mold labeling provides a smooth transition between the label and the adjacent surface of the molded plastic part and further provides additional strength since the label cooperates with the plastic in resisting deformation. Such strengthening also allows the use of less plastic to blow mold the part and thereby reduces the ultimate cost to the consumer. Furthermore, when utilized with containers for carbonated or other beverages, it is believed that in-mold labeling reduces the flow of carbon dioxide and other fluids through the container wall over a period of time and thereby increases the shelf life.

Prior in-mold label dispensers for blow molding machines conventionally include a label carrier having a vacuum cup that receives a label from a label magazine and is then moved to deposit the label within the mold cavity whereupon termination of a vacuum drawn at the suction cup allows a vacuum drawn at the mold cavity to secure the label in position in preparation for the blow molding. Such vacuum type label carriers have previously been mounted on linkages that move the labels in an angular path with respect to the direction of opening and closing movement of mold sections of the mold in order to permit depositing of the labels in the confined space permitted by the extent of the mold opening. With the linkage type of label carrier, only one label can be deposited within the mold at a given time since movement thereof on the linkage toward one mold section interferes with movement of a similar linkage toward an opposed mold section for depositing another label.

Another prior art type of in-mold label dispenser is disclosed by U.S. Pats. Nos. 4,355,967 and 4,359,314 and includes a label carrier that is moved along an abruptly curved path by a complex linkage which executes a 180 degree turn in order to transfer labels from a label magazine to the mold in preparation for molding. With this complex linkage type label dispenser, it is likewise not possible to deposit more than one label in the mold at a given time due to the limited space present upon opening of the mold.

U.S. Pats. Nos. 3,292,209, 4,397,625, and 4,498,854 disclose in-mold label dispensers wherein fluid motors move label carriages and/or label carriers on the carriages to transfer labels from label stacks into associated molds.

U.S. Pat. No. 3,324,508 discloses an in-mold label dispenser wherein a linkage moves labels from rolls of labels to a mold where the labels are held by an electrostatic charge prior to the blow molding operation.

U.S. Pats. No. 4,479,770 and 4,479,771 of William A. Slat, et al disclose in-mold label dispensers wherein a first solid mechanical drive moves a dispensing head between inserted and withdrawn positions with respect to an open mold and wherein a second solid mechanical drive extends and retracts label carriers in order to perform the labeling operation. Use of such solid mechanical drives to move the dispensing head and the label carriers permits accurate positioning of the labels.

U.S. Pat. No. 4,479,644 discloses another type of in-mold label dispenser for use with a plastic blow molding machine.

Certain plastic blow molds are constructed such that an elongated guide extending between the opposite sides of the mold provides support for the movable dispensing head or carriage in which the label carriers are mounted. Normally the dispensing head or carriage is pivoted about the guide to provide movement of the label carriers to the label transfer position where the labels are released and secured to the mold by vacuum. However, with certain mold constructions, there is insufficient room to position an elongated guide extending between the opposite sides of the mold and still permit the movement of the label carriers to the label transfer position in the inserted position between the open mold cavities. While it is possible to support the dispensing head or carriage in a cantilevered fashion for movement to the inserted position for depositing the labels, this results in a decreased accuracy in label placement and a resultant decrease in quality of the labeled product after the blow molding.

DISCLOSURE OF INVENTION

An object of the present invention is to provide an improved in-mold label dispenser for use with a plastic blow molding machine to provide accurate placement of labels within the mold even when the mold construction does not permit the use of an elongated guide extending between the opposite sides of the mold to guide a dispensing head or carriage used to transfer the labels to the mold.

The in-mold label dispenser according to the invention is utilized with a plastic blow molding machine including a mold having a pair of mold sections each of which includes at least one and preferably a plurality of cavity sections. The mold sections are movable toward and away from each other between an open position spaced from each other and a closed position where each pair of associated cavity sections thereof cooperate to define an enclosed cavity in which blow molding is performed.

The in-mold label dispenser utilized with the blow molding machine to carry out the above and other objects of the invention includes a base having first and second portions located on opposite sides of the mold. A label magazine is mounted on the first base portion on one side of the mold and receives a stack of labels to be transferred to the mold for the in-mold labeling operation. A dispensing head is also mounted on the first base portion for movement between a withdrawn position adjacent the label magazine and an inserted position between the open mold sections. A label carrier on the dispensing head receives a label from the magazine with the dispensing head in the withdrawn position and transfers the label to the cavity section of one mold section with the dispensing head in the inserted position between the open mold sections. A first locator of the in-mold label dispenser is provided on the dispensing head, while a second locator is mounted on the second base portion on the opposite side of the mold from the first base portion that mounts the dispensing head. The first and second locators are engaged with each other upon movement of the dispensing head to the inserted position to cooperate in locating the dispensing head and label carrier thereof with respect to the open mold to provide accuracy in aligning the labels with respect to the cavity section that receives the label.

In its preferred construction, the in-mold label dispenser includes first and second supports respectively mounted for movement on the first and second base portions preferably in a pivotal manner about a common axis. The dispensing head and the first locator are mounted on the first support for movement with respect thereto between the withdrawn and inserted positions with respect to the open mold. The second locator is mounted on the second support on the opposite side of the mold from the first support that mounts the dispensing head and the first locator. A first actuator extends between the first base portion and the first support and is operable to move the first support and the dispensing head thereon between an aligned position with respect to the open mold and a label transfer position. A second actuator extends between the second base portion and the second support and is operable with the dispensing head in the inserted position to cooperate with the first actuator in moving the dispensing head between the mold aligned and label transfer positions.

In the preferred construction, the in-mold label dispenser also includes a first operator mounted on the first support for movement therewith and operable to move the dispensing head between the withdrawn and inserted positions. This first operator is preferably embodied by a cylinder having a body mounted on the first support and also having a movable connecting rod extending outwardly from the body to the dispensing head. A slide assembly of the in-mold label dispenser extends between the dispensing head and the first support to prevent rotation of the dispensing head about the cylinder connecting rod. This slide assembly preferably includes an elongated slide member that extends between the dispensing head and the first support. A bushing of the slide assembly is provided on the first support and slidably receives the slide member to permit movement of the dispensing head between the withdrawn and inserted positions under the impetus of the cylinder that embodies the first operator. The first locator has an elongated shape and extends away from the dispensing head in an opposite direction as the slide member of the slide assembly.

In the preferred construction disclosed, the in-mold label dispenser also includes a second operator that moves the second locator on the second support between a withdrawn position with respect to the mold and an inserted position where the second locator engages the first locator to cooperate therewith in positioning the dispensing head as previously described. This second operator is preferably embodied by a cylinder having a body mounted on the second support and having a movable connecting rod extending from the body thereof to support the second locator for movement between the withdrawn and inserted positions.

In its preferred construction disclosed, the in-mold label dispenser also includes a skid that extends downwardly from the dispensing head to provide support thereof during movement between the withdrawn and inserted positions. The skid thus initially supports the dispensing head so that the first and second locators move into engagement with each other as the first operator moves the dispensing head to the inserted position. Subsequent engagement of the first and second locators as described above thereafter accurately locates the dispensing head as the first and second actuators cooperate to move the dispensing head to the label transfer position to transfer labels thereon to the mold.

An alternate embodiment of the in-mold label dispenser also includes at least one second label magazine mounted on the second base portion on the opposite side of the mold as the first base portion. The second dispensing head is mounted on the second base portion for movement between a withdrawn position adjacent the second label magazine and an inserted position between the open mold sections. The second locator is mounted on the second dispensing head and is engaged with the first locator on the first dispensing head upon movement of the first and second dispensing heads to the inserted positions thereof between the open mold sections. A label carrier on the second dispensing head receives a label from the second magazine in the withdrawn position and transfers the label to the mold in the inserted position.

This alternate embodiment of the in-mold label dispenser like the previously described embodiment preferably includes first and second sets of the label magazines respectively mounted on the first and second base portions. First and second sets of the label carriers are respectively associated with the first and second sets of label magazines and are respectively mounted on the pair of dispensing heads to supply multiple labels to the mold as the dispensing heads move to the inserted positions thereof between the open mold sections.

The objects, features, and advantages of the present invention are readily apparent from the following detailed description of the best modes for carrying out the invention when taken in conjunction with the accompanying drawings.

BRIEF DESCRIPTION OF DRAWINGS

FIG. 4 is an elevation view of the end of the in-mold label dispenser taken along the direction of line 4—4 in FIG. 3C;

BEST MODES FOR CARRYING OUT THE INVENTION

Figure 1:
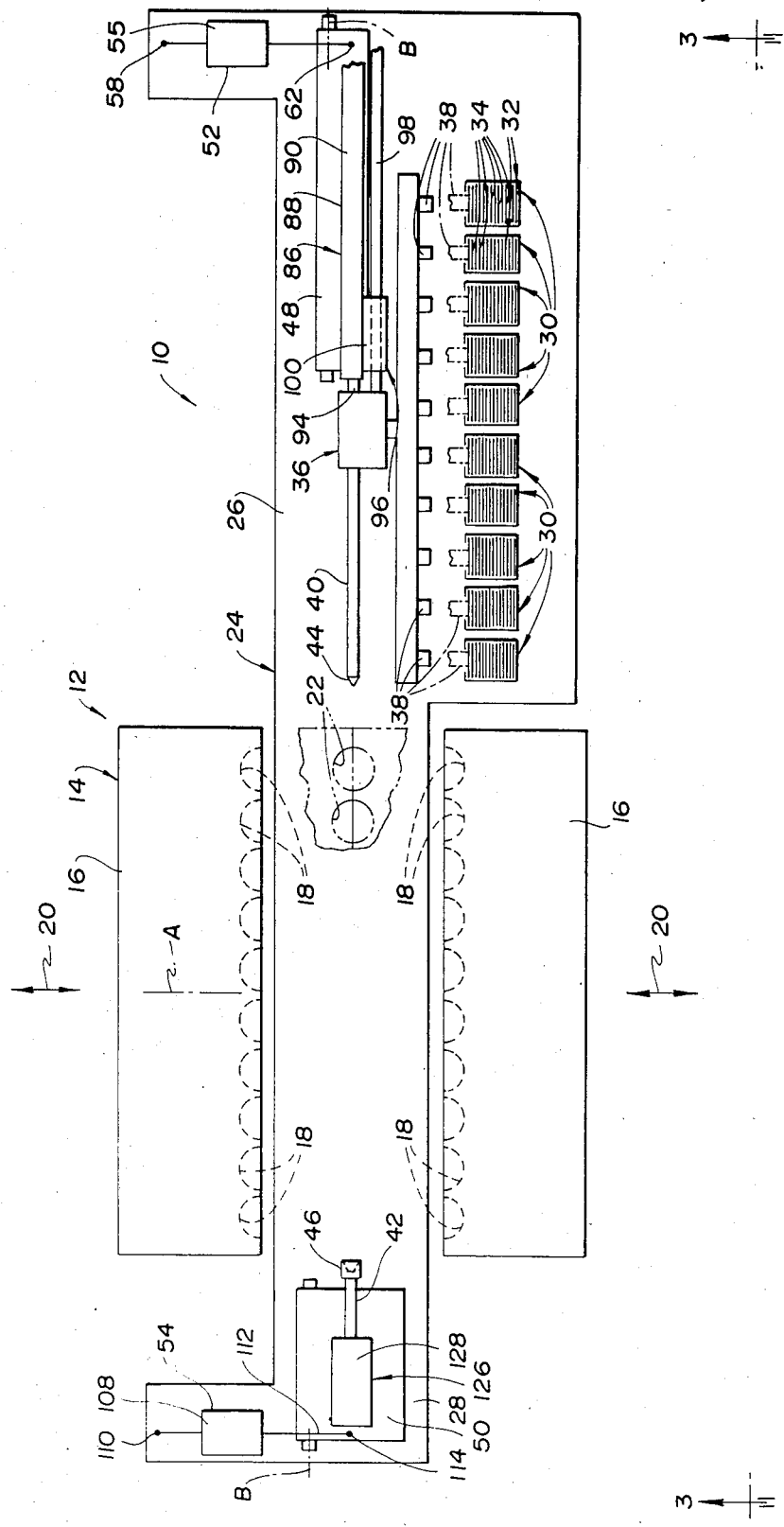
FIG. 1 is a schematic top plan view of a mold of a plastic blow molding machine and an in-mold label dispenser that is utilized therewith and constructed in accordance with the present invention with a dispensing head thereof illustrated in a withdrawn position adjacent label magazines.
Figure 2:
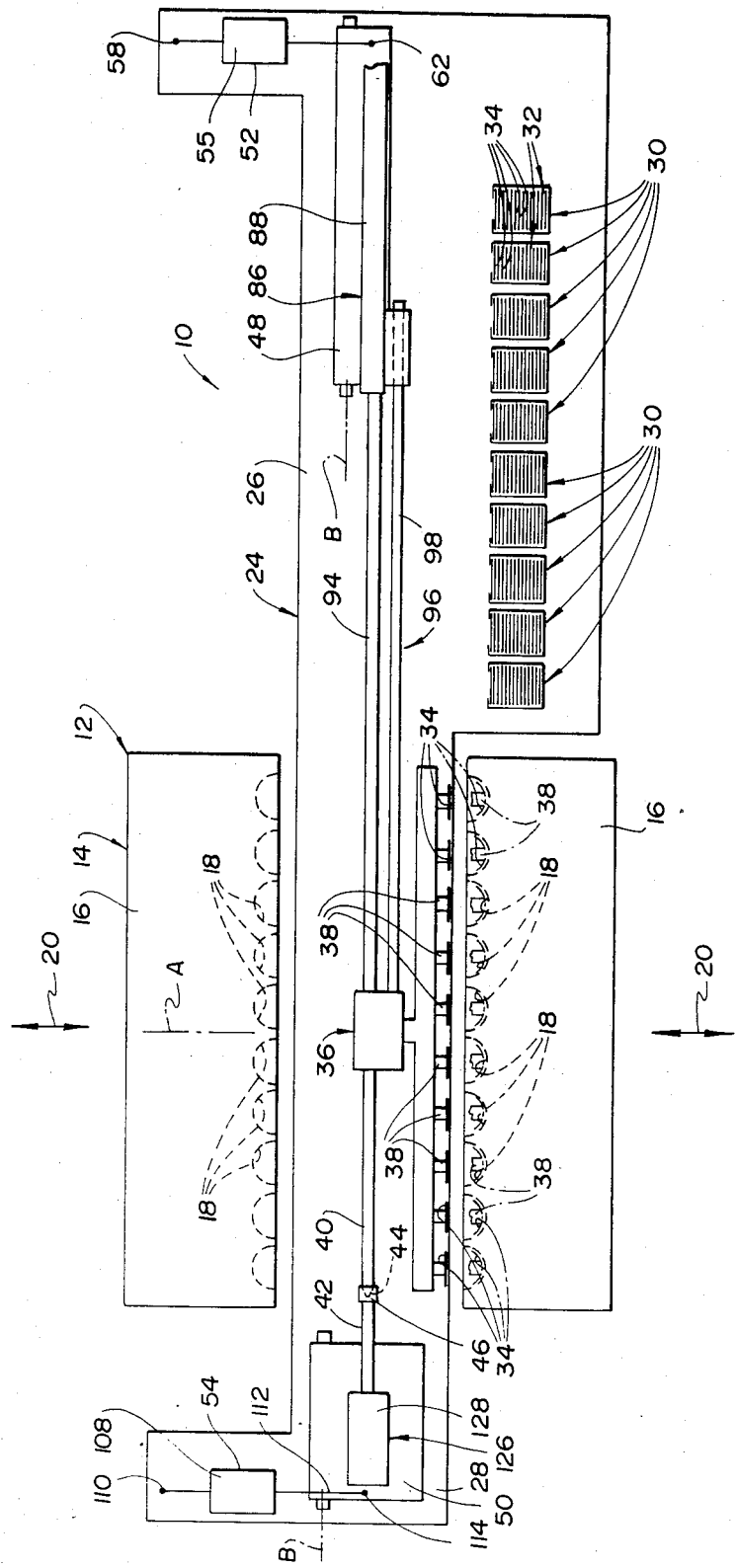
FIG. 2 is a view similar to FIG. 1 but illustrated with the dispenser head moved to an inserted position between open mold sections of the mold to provide transfer of labels from the magazines to the mold.

With reference to the schematic view of FIGS. 1 and 2 of the drawings, an in-mold label dispenser 10 constructed in accordance with the present invention is utilized with a plastic blow molding machine 12 including a mold 14 having a pair of mold sections 16. In-mold label dispenser 10 has particular utility when utilized with a mold 14 of the multiple cavity type illustrated with each mold section 16 including a plurality of cavity sections 18. The particular utility of the in-mold label dispenser 10 with multiple cavity molds is greatest when the cavity sections 18 are arranged in line with each other and when there is a large number of cavity sections such as the ten cavity sections 18 on each mold section 16 as illustrated. However, it should be appreciated that the in-mold label dispenser can also be used with a single cavity mold as will be apparent from the following description.

Mold sections 16 of the mold 14 are movable along an axis A as indicated by arrows 20 in a conventional manner toward and away from each other. In the open position illustrated by solid line representation in FIG. 1, mold sections 16 are spaced from each other to permit ejection of previously molded parts and to also permit introduction of labels into the cavity sections 18 of one mold section 16 in preparation for the next cycle. In the closed position of the mold 14 as illustrated by phantom line representation in FIG. 1, each pair of opposed cavity sections 18 cooperate to define an enclosed cavity 22 in which the blow molding is performed. it should be appreciated that it is also possible to use an in-mold label dispenser 10 that provides labels to each cavity section 18 of each cavity 22 in order to provide labeling of both sides of the blow molded part.

With continuing reference to FIGS. 1 and 2, the in-mold label dispenser 10 includes a base 24 that is located below the mold 14 and has first and second portions 26 and 28 located on opposite sides of the mold. A plurality of label magazines 30 corresponding to the number of cavity sections 18 in each mold section 16 are mounted on the first base portion 26 of base 24 adjacent the mold 14 and each includes a stack 32 of labels 34 to be supplied to the mold 14. A dispensing head 36 is also mounted on the first base portion 26 as is hereinafter described and is movable between a withdrawn position adjacent the label magazines 30 as illustrated in FIG. 1 and an inserted position between the open mold sections as illustrated in FIG. 2. A plurality of label carriers 38 corresponding in number to the number of label magazines 30 and cavity sections 18 in each mold section are mounted on the dispensing head 36 to provide support of the labels 34 during the in-mold labeling operation. Label carriers 38 are preferably constructed as vacuum cups to which a vacuum is supplied to secure the labels during the transfer operation from the magazines 30 to the mold cavity sections 18. As the labels 34 are initially placed in the mold cavity sections 18 as is hereinafter more fully described, it is possible to use positive pressure gas to release the labels from the label carriers 38 and, at the same time, a vacuum applied in the mold cavity sections 18 then secures the labels in preparation for the blow molding operation.

As illustrated in FIG. 1, a first locator 40 of the label dispenser has an elongated shape and is mounted on the dispensing head 36 extending toward the second base portion 28. A second locator 42 of the in-mold label dispenser is mounted on the second base portion 28 in a manner which is also hereinafter more fully described. Upon movement of the dispensing head 36 from the withdrawn position of FIG. 1 to the inserted position of FIG. 2, the first and second locators 40 and 42 are engaged with each other to cooperate in locating the dispensing head and the label carriers 38 thereon with respect to the open mold 14 to provide accuracy in aligning the labels 34 with respect to the cavity sections 18 that receive the labels. The elongated shape of the first locator 40 preferably has a distal end 44 of a pointed shape, while the second locator 42 has a distal end 46 defining a socket for receiving the pointed distal end 44 of the first locator. Any slight misalignment prior to the initial engagement of the locators 40 and 42 with each other is accommodated for by the locator ends 44 and 46 which ultimately are precisely located with respect to each other upon full engagement as illustrated in FIG. 2.

As illustrated in FIGS. 1, 2, 3A, 3B, 3C, 4, and 5, the in-mold label dispenser 10 also includes first and second supports 48 and 50 that are respectively mounted on the first and second base portions 26 and 28 preferably in a pivotal manner for rotation about a common axis B. The dispensing head 36 and the first locator 40 are mounted on the first support 48 for movement between the withdrawn and inserted positions with respect to the open mold as respectively illustrated in FIGS. 1 and 2, while the second locator 42 is mounted on the second support 50. A first actuator 52 extends between the first base portion 26 and the first support 48 and is operable to move the first support and the dispensing head 36 thereon between an aligned position with respect to the open mold as illustrated by solid line representation in FIGS. 1 and 2 and a label transfer position as indicated by phantom line representation. A second actuator 54 extends between the second base portion 28 and the second support 50 and is operable with the dispensing head 36 in the inserted position of FIG. 2 to cooperate with the first actuator 52 in moving the dispensing head 36 between the aligned and label transfer positions.

As illustrated in FIG. 4, the first actuator 52 is preferably embodied by a cylinder 55 having a cylinder end 56 that is connected by a pivotal connection 58 to the first portion 26 of the base 24. A rod end 60 of the cylinder actuator 52 has a pivotal connection 62 to the pivotal first support 48 on which the dispensing head is movably mounted as is hereinafter more fully described. Extension and retraction of the cylinder actuator 52 pivots the first support 48 and the dispensing head and first locator thereon about axis B between the mold aligned position shown by phantom line representation and the label transfer position shown by solid line representation. A control sensor 64 of any conventional type is mounted in a suitable manner on the first base portion 24 and senses the positioning of the first support 48 in the mold aligned position to provide control thereof during an operational cycle of the in-mold label dispenser.

Figure 3A:
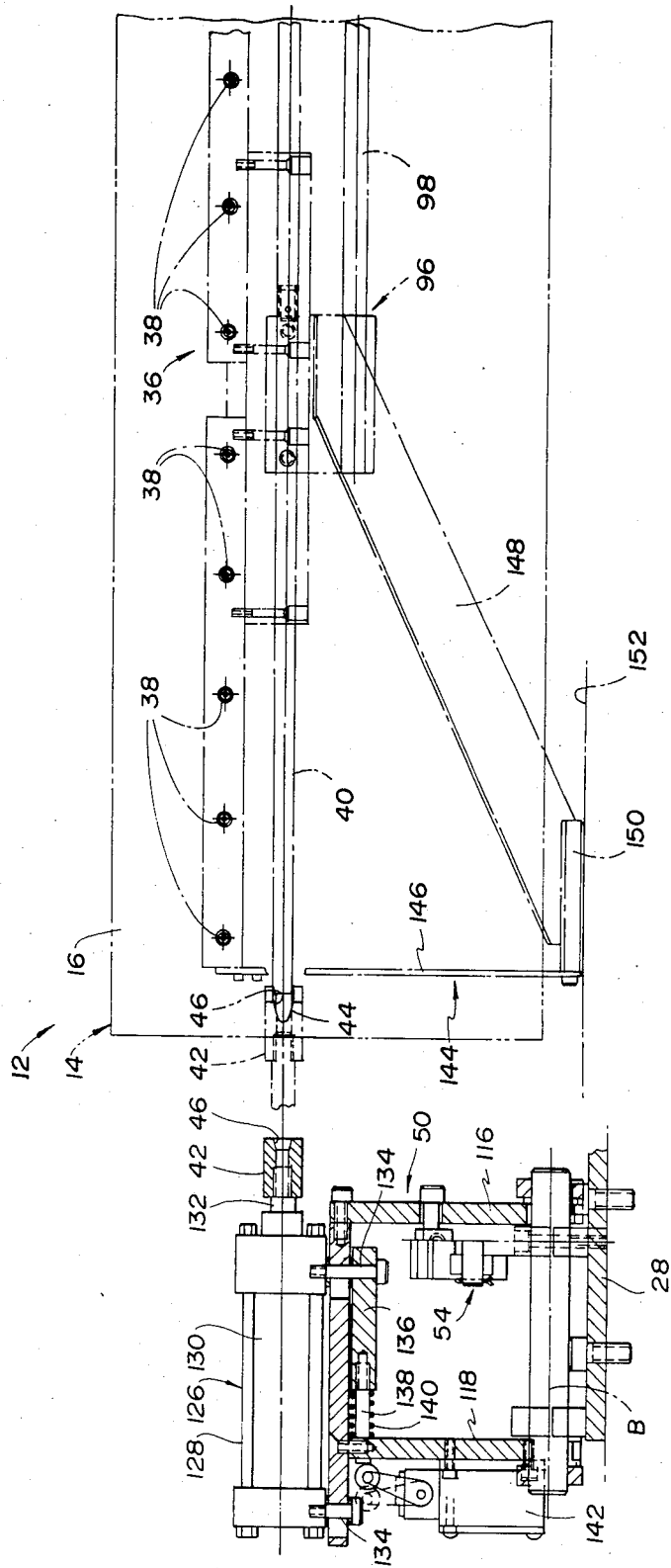
FIGS. 3A, 3B, and 3C, arranged in order from left to right, cooperatively provide an elevation view taken along the direction of line 3—3 in FIG. 1 to further illustrate the construction of the in-mold label dispenser.
Figure 3B:
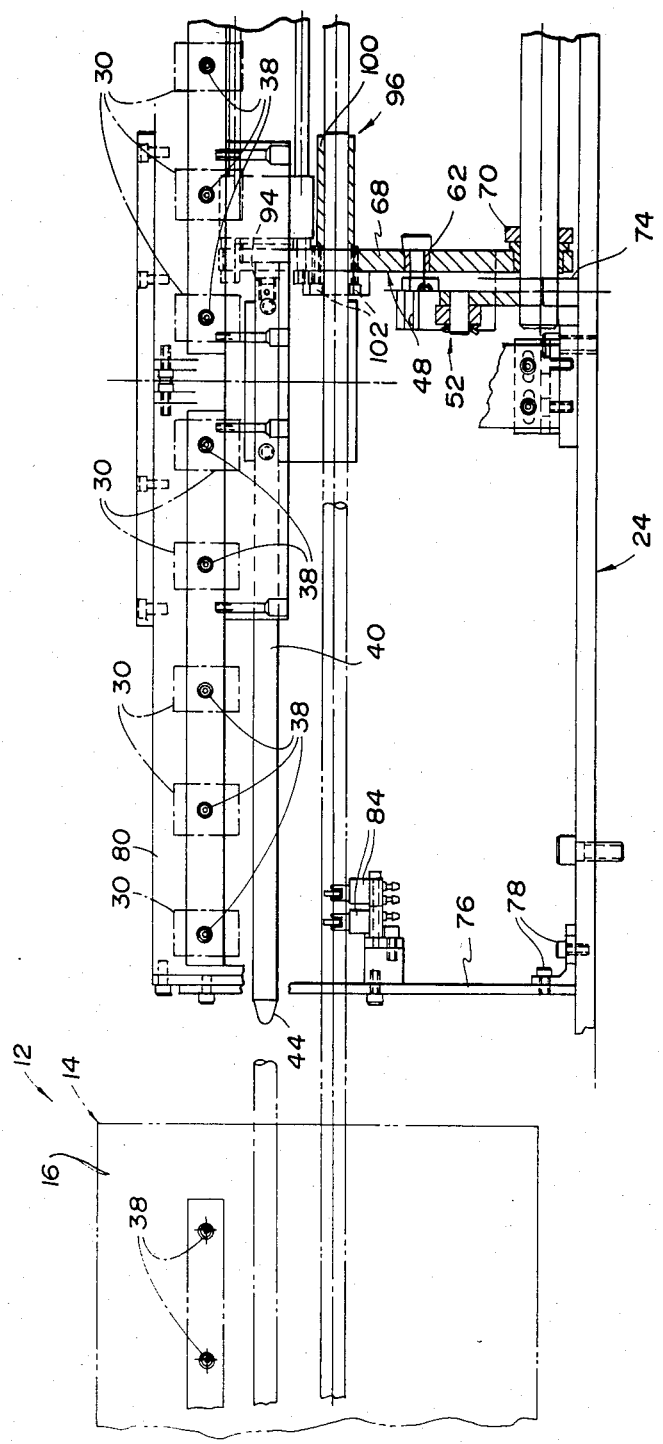
Figure 3C:
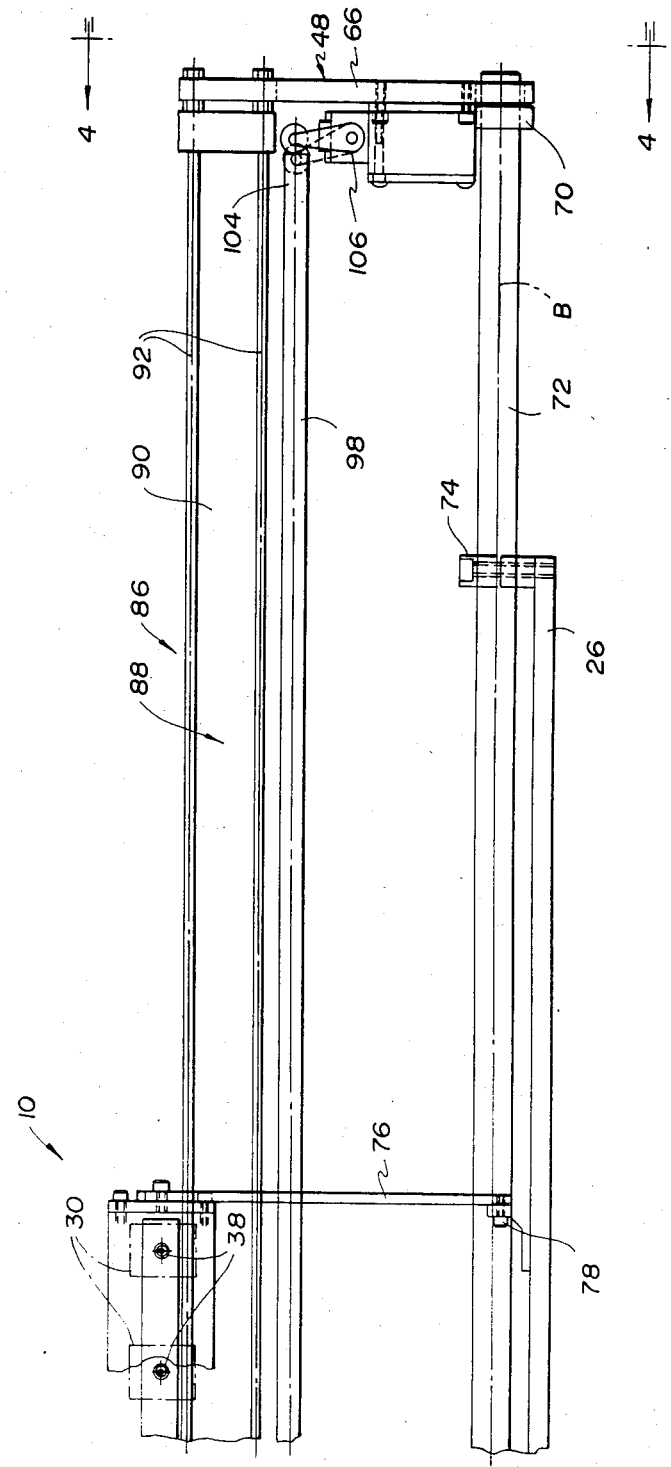

As illustrated by combined reference to FIGS. 3B, 3C, and 4, the first support 48 preferably includes a pair of spaced plates 66 and 68 that extend vertically and have lower ends pivotally supported by associated bearings 70 on a support shaft 72 for rotation about axis B. Suitable mounts 74 secure the support shaft 72 to the first base portion 26 in any convenient manner. As shown in FIG. 3B, the first cylinder actuator 52 has its rod end 60 secured by the pivotal connection 62 to the one plate 68 of the first support 48.

With continued combined reference to FIGS. 3B, 3C, and 4, vertically extending plates 76 have lower ends secured by connection bolts 78 to the first base portion 26 and have upper ends that support plates 82 on which the label magazines 30 are adjustably secured to permit the proper location thereof with respect to the dispensing head label carriers 38 that provide the label transfer operation. One of the plates 76, illustrated in the left portion of FIG. 3B and in FIG. 4, supports control sensors 84 that are responsive to movement of the dispensing head to the label transfer position during the operational cycle of the in-mold label dispenser as is hereinafter more fully described.

With combined reference to FIGS. 3A, 3B, 3C, and 4, the in-mold label dispenser also includes a first operator 86 mounted on the first support 48 by attachment to the plates 66 and 68 thereof as is hereinafter more fully described. The operator 86 is movable with the first support 48 during movement thereof between the mold aligned and label transfer positions and is also operable to move the dispensing head 36 between the withdrawn position as illustrated by solid lines in FIG. 3B and the inserted position as illustrated by phantom lines in FIG. 3A. As best illustrated in FIGS. 3B and 3C, the first operator 86 is preferably constructed as a cylinder 88 having a cylinder body 90 whose tie-bolt connectors 92 provide connection thereof to the upper ends of the plates 66 and 68 of first support 48. Cylinder 88 as best illustrated in FIGS. 1 and 2 also has a piston connecting rod 94 that extends outwardly from the cylinder body 90 mounted on the first support 48 as previously described. Operation of the cylinder 88 preferably by a supply of pressurized air extends and retracts the piston connecting rod 94 from the cylinder body 90 to provide the movement of the dispensing head 36 between the withdrawn position of FIG. 1 and the inserted position of FIG. 2.

With combined reference to FIGS. 1, 2, and 3A, B, and C, a slide assembly 96 extends between the dispensing head 36 and the first support 48 to prevent rotation of the dispensing head about the connecting rod 94 of cylinder 88. This slide assembly 96 includes an elongated slide member 98 that extends from the dispensing head 36 toward the first support 48. Slide assembly 96 also includes a bushing 100 that is mounted on the first support 48 by attachment to the upper end of plate 68 thereof as illustrated in FIG. 3B with the securement thereto being provided by suitable bolts 102. Bushing 100 slidably receives the elongated slide member 98 that extends from the dispensing head 36 to permit the dispensing head movement between the withdrawn and inserted positions under the impetus of the cylinder 88 without any rotation of the dispensing head about the piston connecting rod 94. As illustrated in FIGS. 3B and 4, the elongated slide member 98 engages the control sensors 84 in the label transfer position of the dispensing head to provide operational control. As illustrated in FIG. 3C, the elongated slide member 98 also has a distal end 104 that engages a control sensor 106 mounted on the plate 66 of the first support 48 to indicate movement of the dispensing head to and from the withdrawn position in order to provide control during the operational cycle of the in-mold label dispenser. As previously mentioned, the first locator 40 has an elongated shape that extends away from the dispensing head 36 in an opposite direction as the slide member 98 whose end 104 engages the control sensor 106 to provide this operational control.

With combined reference to FIGS. 1, 2, 3A, and 5, the second actuator 54 is embodied by a cylinder 108 having a cylinder body end pivotally secured by a connection 110 (FIG. 5) to the second base portion 28 about an axis parallel to the axis B about which both supports rotate as previously described. A piston connecting rod 112 of cylinder 108 is pivotally secured by a connection 114 to one plate 116 of the second support 50. Another plate 118 of the second support has a shape generally similar to the plate 116 with lower ends of both plates pivotally supported by ends of a pin 120 for rotation about axis B. Lugs 122 of the second base portion 28 extend upwardly to provide support of the pin 120. Plates 116 and 118 of the second support 50 have upper ends to which a plate 124 is secured by suitable bolts 125. As is hereinafter more fully described, a second operator 126 mounts the second locator 42 on the plate 124 of second support 50 for movement therewith under the impetus of the second actuator 54 between the mold aligned and the label transfer positions previously discussed.

As best illustrated in FIGS. 1, 2, 3A, and 5, the second operator 126 moves the second locator 42 on the second support 50 between a withdrawn position with respect to the mold as illustrated in FIG. 1 and an inserted position as illustrated in FIG. 2 where the second locator engages the first locator 40 at the ends 44 and 46 thereof to cooperate in positioning the dispensing head during the label transfer cycle. This second operator 126 is constructed as a cylinder 128 having a body 130 mounted in a manner which is hereinafter more fully described on the plate 124 of the second support 50. Cylinder 128 also includes a movable piston connecting rod 132 (FIG. 5) extending outwardly from the body 130 to support the second locator 46 for movement between the withdrawn and inserted positions.

As illustrated in FIG. 3A, a pair of pin and slot connectors 134 mount the cylinder 128 embodying the second operator 126 on the plate 124 of the second support 50 for movement in a direction parallel to the axis B about which both supports are pivoted as previously described. One of the connectors 134 is secured to a control member 136 to which one end of another control member 138 is threaded with its other end extending through a hole in the adjacent plate 118 of the second support 50. A spring 140 extends around the control member 138 and has opposite ends seated against the inner side of the plate 118 and the axial end of the control member 136 to bias the cylinder 128 toward the right. On the outer side of the plate 118 of the second support 50, a control sensor 142 is mounted in any suitable manner. Normally the spring 140 positions the cylinder 128 at its right extreme of travel as illustrated in FIG. 3A. Upon movement of the first and second locators 40 and 42 to the inserted position illustrated in FIG. 2, the operators 86 and 126 exert a larger biasing force toward the left on the second operating cylinder 128 through the engaged locators 40 and 42 than the second spring 140 does toward the right, such that the second operating cylinder 128 is moved slightly back toward the left as viewed in FIG. 3A as the pin and slot connectors 134 allow such motion. This movement of operating cylinder 128 toward the left moves the control members 136 and 138 toward the left against the bias of the spring 140. The control sensor 142 is then engaged by the left end of the control member 138 to provide a control signal indicating that the dispensing head is properly positioned in its inserted position during the operational cycle of the label dispensing.

As best illustrated in FIG. 3A, the in-mold label dispenser also includes a skid 144 that extends downwardly from the dispensing head 36 to provide support thereof during movement between the withdrawn and inserted positions previously described. Skid 144 includes a vertically extending leg 146 and an inclined leg 148 which both extend downwardly from the dispensing head 36 to support a lower slide foot 150 of the skid. This slide foot 150 of skid 144 slides along a machine surface 152 as illustrated by phantom line representation to provide the dispensing head support during movement between the withdrawn and inserted positions.

The operational cycle of the in-mold label dispenser 10 as described above will now be given with reference to the schematic views of FIGS. 1 and 2. Each cycle begins with the dispensing head 36 positioned in its withdrawn position of FIG. 1 in the mold aligned position on the support 48 as shown by solid line representation. The operational cycle commences by operation of the first actuator 52 which pivots the support 48 about axis B as previously described to the label transfer position where the label carriers 38 are positioned as shown by phantom line representation to receive the adjacent label 34 of the label stacks 32 in label magazines 30. As previously mentioned, a vacuum is preferably drawn at the label carriers 38 to provide the label securement to the label carriers. Actuator 52 is then operated to pivot the first support 38 back about axis B to the mold aligned position. To simplify the control circuitry, it is also possible to extend and retract the second actuator 54 along with the first actuator 52 even though the resultant movement of the second support 50 and the second locator 42 thereon does not perform any necessary function at this commencement of the cycle.

The first operator 86 then moves the dispensing head 36 and the first locator 40 thereon to the inserted position as the second operator 126 also moves the second locator 42 to the inserted position where the engagement between the ends 44 and 46 thereof accurately positions the dispensing head 36 as previously described. First and second actuators 52 and 54 then simultaneously pivot both the first and second supports 48 and 50 about axis B to move the dispensing head 36 from the mold aligned position illustrated by solid line representation in FIG. 2 to the label transfer position where the label carriers 38 position the labels 34 thereon within the mold cavity sections 18 as illustrated by phantom line representation. The vacuum drawn at the label carriers 38 is then terminated as the vacuum is drawn at the mold cavity sections to thereby secure the labels within the one mold section 16 in preparation for the blow molding operation. It is also possible to supply positive pressure air through the label carriers 38 to assist in the transfer of the labels to the mold section 16. After the labels are transferred, the first and second actuators 52 and 54 pivot the first and second supports 48 and 50 about axis B so that the dispensing head 36 is moved back to the mold aligned position shown by solid line representation in FIG. 2. First operator 86 then moves the dispensing head 36 and the first locator 40 from the inserted position of FIG. 2 back to the withdrawn position of FIG. 1 as the second operator 126 likewise moves the second locator 42 from the inserted position of FIG. 2 back to the withdrawn position of FIG. 1. The in-mold label dispenser is then ready for another cycle.

Figure 5:
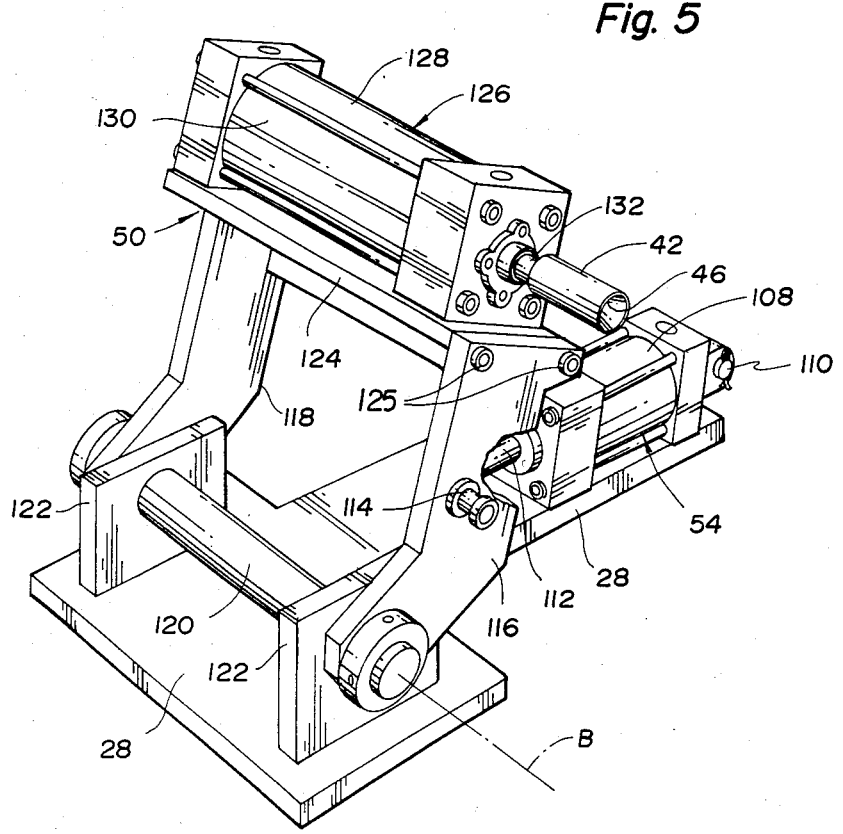
FIG. 5 is a perspective view of a locator that cooperates with another locator on the dispensing head as illustrated in FIG. 2 to locate the dispensing head as labels are transferred to the mold.
Figure 6:
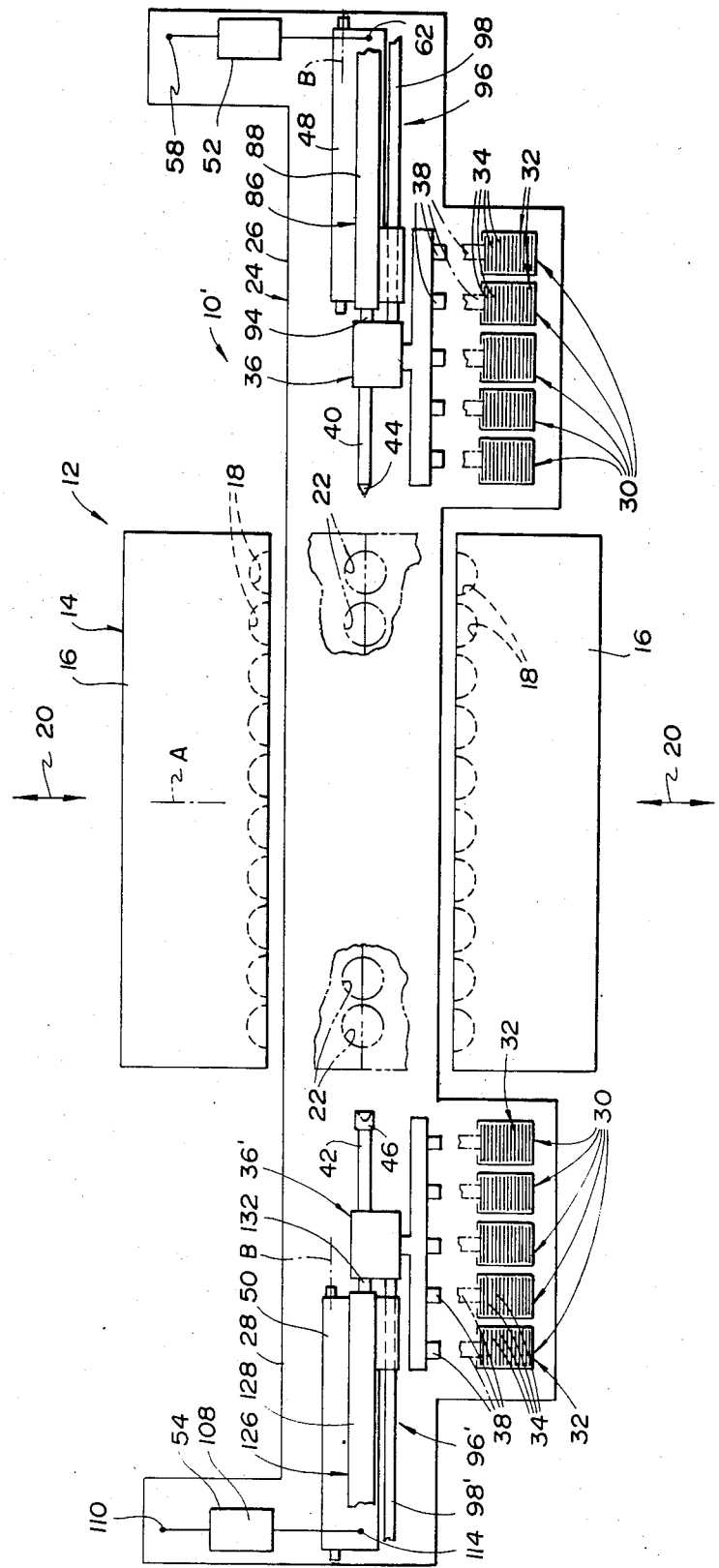
FIGS. 6 and 7 are schematic views respectively similar to FIGS. 1 and 2 and illustrating an alternate embodiment which includes two dispensing heads for transferring labels from associated label magazines on opposite sides of the mold to the mold cavity sections.
Figure 7:
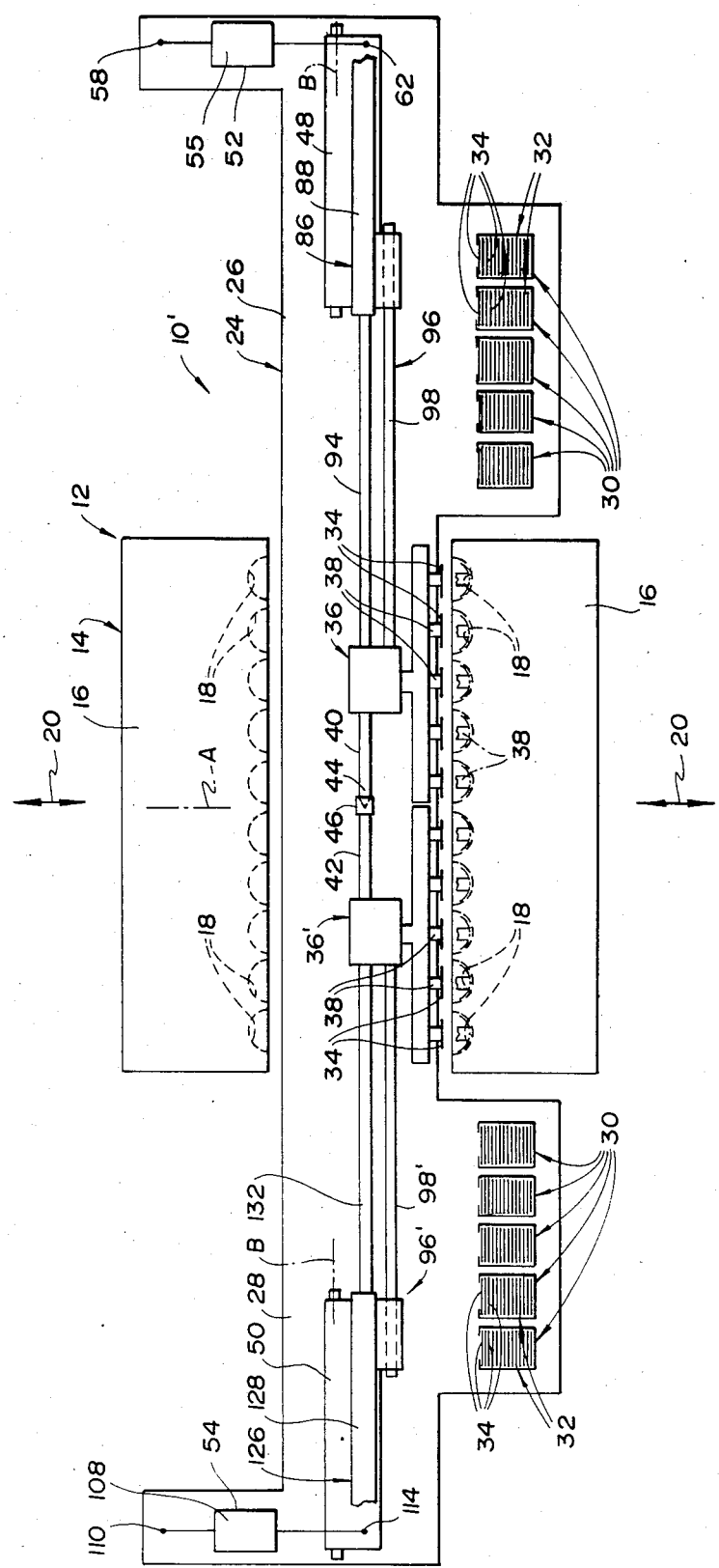

With reference to FIGS. 6 and 7, an alternate embodiment of the in-mold label dispenser is indicated by 10' and is utilized with the same plastic blow molding machine 12 described in connection with the embodiment of FIGS. 1 through 5. This in-mold label dispenser 10' has a construction which is similar to the previously described embodiment such that the same reference numerals are applied thereto and much of the previous description is applicable and need not be repeated.

In-mold label dispenser 10' includes a first dispensing head 36 mounted on the first base portion 26 by a first support 48 that is pivoted about axis B between the mold aligned and label transfer positions by first actuator 52 in the same manner as previously described to provide transfer of some but not all of the labels 34 to the mold 14 for the in-mold labeling. In addition, in-mold label dispenser 10' includes at least one second label magazine 30 mounted on the second base portion 28 and preferably includes a plurality of such label magazines equal in number to one-half of the cavity sections 18 on the mold section 16 to be labeled which is the same number of the label magazines mounted on the first base portion 26. A second dispensing head 36' is mounted on the second base portion 28 for movement between the withdrawn position illustrated in FIG. 6 and the inserted position illustrated in FIG. 7. The second dispensing head 36' is supported on the second support 50 which is pivoted by the second actuator 54 for movement between the mold aligned and label transfer positions in the manner previously described.

First and second operators 86 and 126 respectively move the dispensing heads 36 and 36' between the withdrawn position of FIG. 6 and the inserted position of FIG. 7. The first and second locators 40 and 42 are respectively carried by the first and second dispensing heads 36 and 36' and are engaged with each other in the inserted position to provide accurate location of the dispensing heads during the label transfer operation in order to insure good registration of the labels with the mold cavity sections 18. First and second slide assemblies 96 and 96' respectively extend from the first and second dispensing heads 36 and 36' to the first and second supports 48 and 50 to prevent rotation of the dispensing heads about the piston connecting rods 94 and 132 of the cylinders 88 and 128 that embody the first and second operators 86 and 126. Both of the label carriers 36 and 36' include the label carriers 38 for transferring labels from the associated sets of label magazines 30 to the mold 14.

The operational cycle of the in-mold label dispenser 10' begins with both of the dispensing heads 36 and 36' positioned in the withdrawn position of FIG. 6 with the first and second actuators 52 and 54 positioning the first and second supports 48 and 50 so that the dispensing heads are in the mold aligned position. Operation of the first and second actuators 52 and 54 then pivots the first and second supports 48 and 50 about axis B to move the dispensing heads 36 and 36' to the label transfer position illustrated by phantom line representation where labels are received by the dispensing head in the manner previously described. First and second actuators 52 and 54 then pivot the first and second supports 48 and 50 and the dispensing heads 36 and 36' thereon back to the mold aligned position whereupon the operators 86 and 126 move the dispensing heads to the inserted position of FIG. 7 where the first and second locators 40 and 42 are engaged with each other to accurately align the label carriers with the mold cavity sections 18. First and second actuators 52 and 54 then pivot the first and second supports and the dispensing heads 36 and 36' to the label transfer position where the label carriers 38 are located as shown by phantom line representation in FIG. 7 to provide the transferring of the labels to the mold cavity sections 18. Movement of the dispensing heads 36 and 36' back to the mold aligned position by operation by first and second actuators 52 and 54 is then followed by movement of the dispensing heads under the impetus of the operators 86 and 126 back to the withdrawn position of FIG. 6 to complete the operational cycle.

It should be appreciated that the alternate embodiment of FIGS. 6 and 7 like the embodiment of FIGS. 1 and 5 can be used with each dispensing head supplying only one label during each cycle. However, both embodiments of the in-mold label dispenser have particular utility when a greater number of labels are to be transferred, especially when the mold cavity sections are positioned in alignment with each other such that a relatively great distance must be spanned while still accurately locating the labels upon transfer to the mold.

While the best modes for carrying out the invention have been specifically disclosed, those familiar with the art to which this invention relates will recognize various alternative designs and embodiments for practicing the invention as defined by the following claims.

What is claimed is:

1. An in-mold label dispenser for a plastic blow molding machine, said blow molding machine including a mold having a pair of mold sections each of which includes a cavity section, and said mold sections being movable toward and away from each other between an open position spaced from each other and a closed position where the cavity sections thereof cooperate to define an enclosed cavity in which blow molding is performed, the in-mold label dispenser comprising: a base having first and second portions located on opposite sides of the mold; a label magazine mounted on the first base portion on one side of the mold; a dispensing head mounted on the first base portion for movement between a withdrawn position adjacent the label magazine and an inserted position between the open mold sections; a label carrier on the dispensing head for receiving a label from the label magazine with the dispensing head in the withdrawn position and for transferring the label to the cavity section of one mold section with the dispensing head in the inserted position between the open mold sections; a first locator on the dispensing head; and a second locator that is mounted on the second base portion, said second locator being engaged with the first locator upon movement of the dispensing head to the inserted position to cooperate in locating the dispensing head and label carrier thereof with respect to the open mold to provide accuracy in aligning the label with respect to the cavity section that receives the label.

2. An in-mold label dispenser as in claim 1 further including first and second supports respectively mounted for movement on the first and second base portions, the dispensing head and the first locator being mounted on the first support for movement between the withdrawn and inserted positions with respect to the open mold, the second locator being mounted on the second support, a first actuator extending between the first base portion and the first support, said first actuator being operable to move the first support and the dispensing head thereon between an aligned position with respect to the open mold and a label transfer position, a second actuator extending between the second base portion and the second support, and said second actuator being operable with the dispensing head in the inserted position to cooperate with the first actuator in moving the dispensing head between the mold aligned position and the label transfer position .

3. An in-mold label dispenser as in claim 2 further including a first operator mounted on the first support for movement therewith, and said first operator being operable to move the dispensing head between the withdrawn and inserted positions.

4. An in-mold label dispenser as in claim 3 wherein the first operator comprises a cylinder, said cylinder having a body mounted on the first support, said cylinder also having a movable connecting rod extending outwardly from the cylinder body to the dispensing head, and said in-mold label dispenser further including a slide assembly that extends between the dispensing head and the first support to prevent rotation of the dispensing head about the cylinder connecting rod.

5. An in-mold label dispenser as in claim 4 wherein the slide assembly includes an elongated slide member that extends from the dispensing head toward the first support, and the slide assembly also including a bushing on the first support, said bushing slidably receiving the elongated slide member to permit the movement of the dispensing head between the withdrawn and inserted positions under the impetus of the cylinder that embodies the first operator.

6. An in-mold label dispenser as in claim 5 wherein the first locator has an elongated shape, and said first locator extending away from the dispensing head in an opposite direction as the elongated slide member of the slide assembly.

7. An in-mold label dispenser as in claim 3, 4, 5 or 6 further including a second operator that moves the second locator on the second support between a withdrawn position with respect to the mold and an inserted position where the second locator engages the first locator to position the dispensing head in alignment with the cavity section that receives the label.

8. An in-mold label dispenser as in claim 7 wherein the second operator comprises a cylinder, said cylinder of the second operator having a body mounted on the second support, and said cylinder of the second operator also having a movable connecting rod extending from the body thereof to support the second locator for movement of the second locator between the withdrawn and inserted positions.

9. An in-mold label dispenser as in claim 1, 2, 3, 4, 5 or 6 further including a skid, said skid extending downwardly from the dispensing head to provide support for the dispensing head during movement of the dispensing head between the withdrawn and inserted positions.

10. An in-mold label dispenser as in claim 1 further including a second label magazine, said second label magazine being mounted on the second base portion, a second dispensing head movably mounted on the second base portion, said second dispensing head being movable between a withdrawn position adjacent the second label magazine and an inserted position between the open mold sections, the second locator being mounted on the second dispensing head and said second locator being engaged with the first locator upon movement of the first and second dispensing heads to the inserted positions between the open mold sections, and a label carrier on the second dispensing head, said label carrier on the second dispensing head receiving a label from the second magazine in the withdrawn position of the second dispensing head, and said label carrier on the second dispensing head transferring the label to the mold in the inserted position of the second dispensing head.

11. An in-mold label dispenser as in claim 10 wherein first and second sets of label magazines are respectively mounted on the first and second base portions, and first and second sets of label carriers respectively mounted on the pair of dispensing heads to supply multiple labels to the mold as the dispensing heads move to the inserted positions between the open mold sections.

12. An in-mold label dispenser for a plastic blow molding machine, said blow molding machine including a mold having a pair of mold sections each of which includes a cavity section, and said mold sections being movable toward and away from each other between an open position spaced from each other and a closed position where the cavity sections thereof cooperate to define an enclosed cavity in which blow molding is performed, the in-mold label dispenser comprising: a base having first and second portions located on opposite sides of the mold; a label magazine mounted on the first base portion on one side of the mold; a dispensing head mounted on the first base portion for movement between a withdrawn position adjacent the label magazine and an inserted position between the open mold sections; a label carrier on the dispensing head for receiving a label from the label magazine with the dispensing head in the withdrawn position and for transferring the label to the cavity section of one mold section with the dispensing head in the inserted position between the mold sections of the open mold; a first locator on the dispensing head; and a second locator mounted on the second base portion for movement between a withdrawn position with respect to the open mold and an inserted position between the open mold sections, said second locator being engaged with the first locator in the inserted positions to cooperate in locating the dispensing head and label carrier with respect to the open mold to provide accuracy in aligning the label with respect to the cavity section that receives the label.

13. An in-mold label dispenser for a plastic blow molding machine, said blow molding machine including a mold having a pair of mold sections each of which includes a cavity section, and said mold sections being movable toward and away from each other between an open position spaced from each other and a closed position where the cavity sections thereof cooperate to define an enclosed cavity in which blow molding is performed, the in-mold label dispenser comprising: a base having first and second portions located on opposite sides of the mold; a label magazine mounted on the first base portion on one side of the mold; a support mounted on the first base portion adjacent the label magazine; a dispensing head mounted by the support on the first base portion for movement between a withdrawn position adjacent the label magazine and an inserted position between the open mold sections; a label carrier on the dispensing head for receiving a label from the label magazine with the dispensing head in the withdrawn position and for transferring the label to the cavity section of one mold section with the dispensing head in the inserted position between the mold sections of the open mold; a first locator on the dispensing head; an operator including a cylinder extending between the support and the dispensing head to provide movement of the dispensing head between the withdrawn and inserted positions with respect to the mold; a slide assembly that also extends between the support and the dispensing head to prevent rotation of the dispensing head about the cylinder; and a second locator that is mounted on the second base portion, said second locator being engaged with the first locator upon movement of the dispensing head to the inserted position to locate the dispensing head and label carrier with respect to the open mold to provide accuracy in aligning the label with respect to the cavity section that receives the label.

14. An in-mold label dispenser for a plastic blow molding machine, said blow molding machine including a mold having a pair of mold sections each of which includes a cavity section, and said mold sections being movable toward and away from each other between an open position spaced from each other and a closed position where the cavity sections cooperate to define an enclosed cavity in which blow molding is performed, the in-mold label dispenser comprising: a base having first and second portions located on opposite sides of the mold; first and second supports respectively pivotally mounted on the first and second base portions about a common axis; first and second actuators for pivoting the first and second supports on the first and second base portions between a mold aligned position and a label transfer position; a plurality of label magazines mounted on the first base portion on one side of the mold; a dispensing head mounted by the first support on the first base portion for movement between a withdrawn position adjacent the label magazines and an inserted position between the open mold sections; a plurality of label carriers on the dispensing head for receiving labels from the label magazines with the dispensing head in the withdrawn position as the first support is pivoted between the mold aligned position and the label transfer position ; said label carriers transferring the labels to cavity sections of the mold with the dispensing head in the inserted position as the first support is pivoted between the mold aligned position and the label transfer position ; a first locator on the dispensing head; and a second locator mounted by the second support on the second base portion, said second locator being engaged with the first locator upon movement of the dispensing head to the inserted position to locate the dispensing head and label carriers with respect to the open mold to provide accuracy in aligning the labels with respect to the cavity sections that receive the labels as the first and second actuators move the first and second supports between the mold aligned position and the label transfer position .

15. An in-mold label dispenser for a plastic blow molding machine, said blow molding machine including a mold having a pair of mold sections each of which includes a cavity section, and said mold sections being movable toward and away from each other between an open position spaced from each other and a closed position where the cavity sections cooperate to define an enclosed cavity in which blow molding is performed, the in-mold label dispenser comprising: a base having first and second portions located on opposite sides of the mold; first and second supports respectively pivotally mounted on the first and second base portions about a common axis; first and second actuators for pivoting the first and second supports on the first and second base portions between a mold aligned position and a label transfer position; a plurality of label magazines mounted on the first base portion on one side of the mold; a dispensing head mounted by the first support on the first base portion; said dispensing head being movable on the first support between a withdrawn position adjacent the label magazines and an inserted position between the open mold sections; an operator including a cylinder that extends between the first support and the dispensing head; said operator providing movement of the dispensing head between the withdrawn and inserted positions with respect to the mold; a plurality of label carriers on the dispensing head for receiving labels from the label magazines in the withdrawn position as the first support is pivoted between the mold aligned position and the label transfer position; said label carriers transferring the labels to cavity sections of the mold with the dispensing head in the inserted position as the first support is pivoted between the mold aligned position and the label transfer position ; a first locator of an elongated shape that extends from the dispensing head toward the second base portion; a slide assembly including a slide member of an elongated shape that extends from the dispensing head to the first support in the opposite direction as the first locator; the slide assembly also including a bushing on the first support; said bushing receiving the elongated slide member to prevent rotation of the dispensing head about the cylinder; and a second locator that is mounted by the second support on the second base portion, said second locator being engaged with the first locator upon movement of the dispensing head to the inserted position to locate the dispensing head and label carriers with respect to the open mold to provide accuracy in aligning the labels with respect to the cavity sections that receive the labels as the first and second actuators move the first and second supports between the mold aligned position and the label transfer position.

16. An in-mold label dispenser for a plastic blow molding machine, said blow molding machine including a mold having a pair of mold sections each of which includes a cavity section, and said mold sections being movable toward and away from each other between an open position spaced from each other and a closed position where the cavity sections cooperate to define an enclosed cavity in which blow molding is performed, the in-mold label dispenser comprising: a base having first and second portions located on opposite sides of the mold; first and second supports respectively pivotally mounted on the first and second base portions about a common axis; first and second actuators for pivoting the first and second supports on the first and second base portions between a mold aligned position and a label transfer position; a first operator including a first cylinder; said first cylinder extending between the first support and the dispensing head and moving the dispensing head between the withdrawn and inserted positions with respect to the open mold; a plurality of label magazines mounted on the first base portion on one side of the mold; a dispensing head mounted by the first support on the first base portion; said dispensing head being movable on the first support between a withdrawn position adjacent the label magazines and an inserted position between the open mold sections; a plurality of label carriers on the dispensing head for receiving labels from the label magazines in the withdrawn position as the first support is pivoted between the mold aligned position and the label transfer position; said label carriers transferring the labels to cavity sections of the mold with the dispensing head in the inserted position as the first support is pivoted between the mold aligned position and the label transfer position ; a first locator of an elongated shape that extends from the dispensing head toward the second base portion; a slide assembly including a slide member of an elongated shape that extends from the dispensing head to the first support in the opposite direction as the first locator; the slide assembly also including a slide member of an elongated shape that extends from the dispensing head to the first support in the opposite direction as the first locator; the slide assembly also including a bushing on the first support; said bushing receiving the elongated slide member to prevent rotation of the dispensing head about the cylinder; a skid that extends downwardly from the dispensing head to support the dispensing head during movement of the dispensing head between the withdrawn and inserted positions; a second locator movably mounted by the second support on the second base portion; said second locator being movable on the second support between the withdrawn and inserted positions with respect to the mold; and a second operator including a second cylinder, said second cylinder moving the second locator between the withdrawn position and the inserted position where the second locator is engaged with the first locator with the dispensing head in the inserted position of the dispensing head to locate the dispensing head and label carriers with respect to the open mold to provide accuracy in aligning the labels with respect to the cavity sections that receive the labels as the first and second actuators move the first and second supports between the mold aligned position and the label transfer position.

* * * * *